Sept. 16, 1969    A. L. LIVSHITS ET AL    3,467,807
APPARATUS FOR ELECTROEROSION MACHINING OF WORKPIECES
BY MULTIPLE SPACED ELECTRODES
Filed July 13, 1965    2 Sheets-Sheet 1

United States Patent Office 3,467,807
Patented Sept. 16, 1969

3,467,807
APPARATUS FOR ELECTROEROSION MACHINING OF WORKPIECES BY MULTIPLE SPACED ELECTRODES
Abram Lazarevich Livshits, Anatoly Lzrailevich Aronov, Arkady Timofeevich Kravets, and Alexandr Borisovich Sosenko, Moscow, U.S.S.R., assignors to Experimentalny Navchno-Issledouatelsky Institute Metallorezhvshchikh Stankov, Moscow, U.S.S.R.
Filed July 13, 1965, Ser. No. 471,668
Int. Cl. B23p 1/14
U.S. Cl. 219—69
3 Claims

ABSTRACT OF THE DISCLOSURE

The invention consists in the simultaneous employment in the course of electroerosion machining of the following combinations: (1) division of a straight-wall electrode-tool into separate parts; (2) translational movement of the tool relative to the workpiece in lateral directions over a distance exceeding that between separate parts of the electrode; (3) maintenance of a necessary gap between all the parts of the electrode-tool and the workpiece. To realize the aforesaid combination, separate parts of an electrode are connected to a source of electric power through a series of solid-material resistors or through one electrolytic resistor, the gap being controlled in accordance with the potential difference on the workpiece being machined and the output of an additional resistor connected through diodes in parallel to the main resistor.

---

The present invention relates to the electroerosion machining of large surfaces of large workpieces manufactured of conducting materials, in particular, dies, press moulds and turbine blades.

There are known methods of electroerosion machining in a liquid dielectric medium of large surfaces of large workpieces, manufactured of conducting materials.

In the existing methods, large surfaces of large workpieces are machined with solid electrodes having axial feed.

The main disadvantages of these methods are that the machining speeds, and consequently the output must be limited in conjunction with the requirements as to the quality of the surface to be machined, the life of the electrode-tool, as well as to the characteristics of the material of the workpiece and electrode-tool, the power of the pulse generator, and the area and shape of the surface being machined.

An object of the present invention is to eliminate said disadvantages.

A principal object of this invention is the provision of a method of the electroerosion machining of large surfaces of large workpieces, which permits a far greater output than the existing methods.

This object is accomplished by means of the electroerosion machining of large surfaces of large workpieces in a dielectric medium with an electrode-tool which will be hereafter referred to as a cutting tool having axial feed, in which, according to the invention, the cutting tool, made up of separate members, connected in parallel power circuits and spaced so as to preclude electric contact between said members, is imparted with an additional movement in the plane normal to the direction of its feed over a distance exceeding the width of the space between the members of said cutting tool, with the control of the axial feed of the cutting tool being effected with the use of the member of the cutting tool having the maximum load by means of an additional circuit, connected in parallel with the power circuits.

The power circuits may use an electrolyte as a current-limiting resistor.

The automatic control of the feed drive, common for the whole group of members of the cutting tool, is effected according to the voltage across the section of the erosion length where it is minimum, and the signal for controlling the feed is obtained as the difference of potentials at the workpiece being machined and at the outlet of the resistor of the additional circuit, the value of said resistor being considerably greater than the resistance of power circuits, said resistor being connected with one end to the generator pole, and with another end—to diodes, connecting the additional circuit to the members of the cutting electrode-tool.

The liquid dielectric medium is pumped through the spaces between the members of the cutting tool.

It is expedient to form the members of the cutting tool of erosion-resisting graphite.

The attached drawing shows an exemplary embodiment and details of the subject of the invention, in which.

Figure 1:
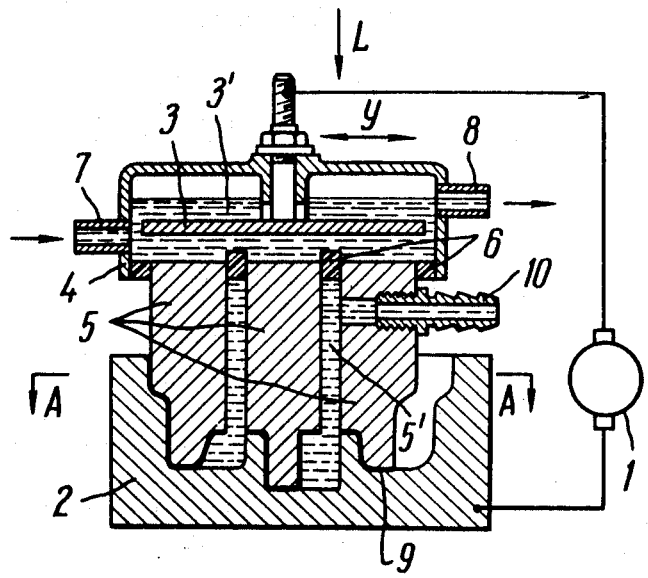
FIG. 1 is a cross-sectional view of the cutting tool for the multiple-contour machining, which is supplied through the electrolyte.
Figure 2:
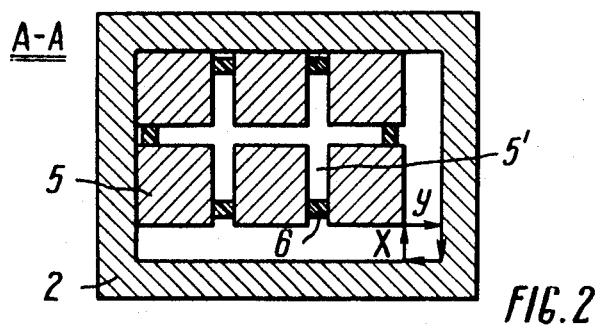
FIG. 2 is a cross-sectional view of the apparatus of FIG. 1 viewed along lines A—A.

As shown in FIGS. 1 and 2, current is supplied from a pulse generator 1 to a workpiece 2 and to a plate electrode 3. The electrode 3 is immersed in electrolyte 3' filling the space of a holder 4. To the holder 4, made of a dielectric material, is fastened a multiple-section cutting tool, consisting of members 5 that are spaced from one another at a distance 5', by means of insulators 6. Through a hole 7, into the space of the holder 4 is supplied the electrolyte 3', to contact the electrode 3 and the ends of the members 5 of the multiple-section cutting tool. Heated by current passing between the electrode 3 and members 5, the electrolyte together with gases evolving during the decomposition thereof flows out from the space of the holder 4 through a hole 8. The working liquid, being a liquid dielectric medium, is pumped through the spaces 5', an erosion path 9, a closed circulation system (which is not shown in the drawings) and a connection piece 10 to prevent the clogging of the spaces 5' and consequent short-circuiting between the members of the cutting tool. The insulators 6 are arranged in such a manner that they do not touch the workpiece 2 being machined. The cutting tool is imparted with an additional movement in relation to the workpiece 2, or vice versa, the workpiece in relation to the cutting tool, in the horizontal plane in order that it should overlap the spaces 5'. The path of such movements may be circular, rectangular, etc., resulting from the addition of reciprocating movement in the directions X and Y.

Figure 4:
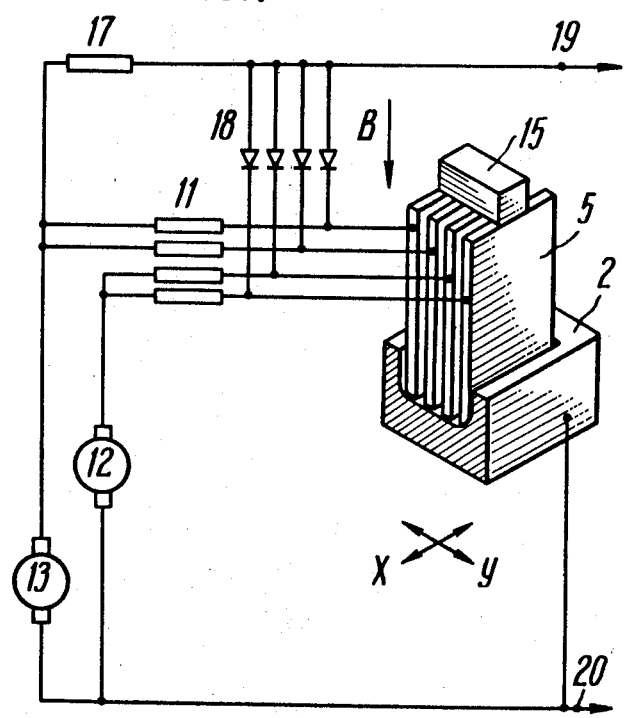
FIG. 4 is a view of the cutting tool with a circuit for taking off the voltage signal across the most loaded section of the erosion length between the workpiece and the members of the cutting tool.
Figure 3:
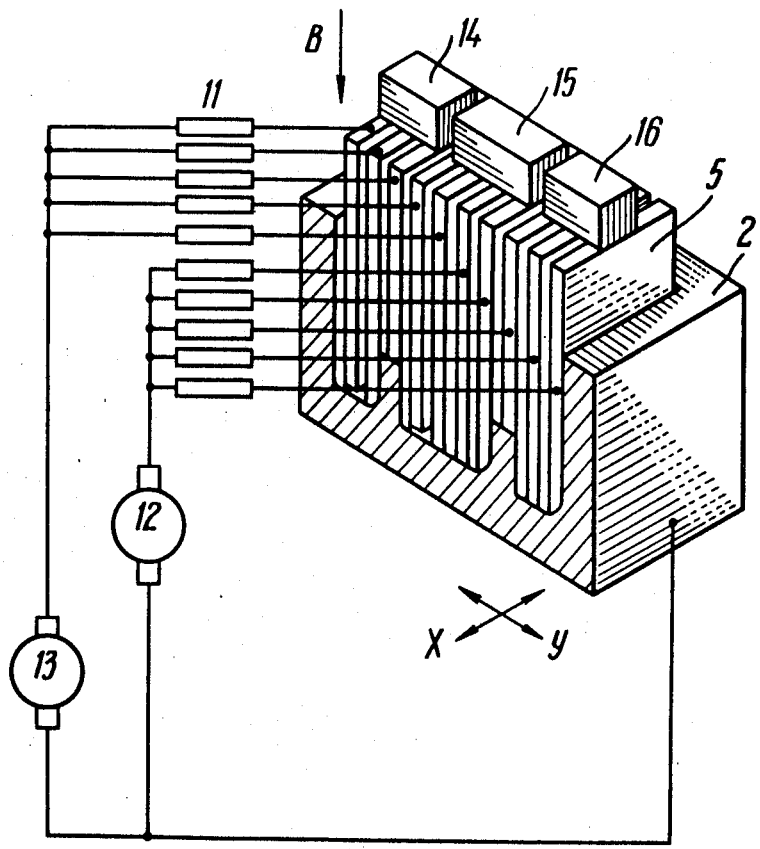
FIG. 3 is a diagram of the cutting tool, which is supplied through power circuits with individual current-limiting resistors from two sources (generators) of various types.

As is shown in FIGS. 3 and 4, the present invention comprises a multiple-section cutting electrode with the members 5 being supplied via limiting resistors 11 from two generators of various types 12 and 13 that may differ in frequency, voltage and other characteristics. In this connection, it is possible to employ both an electrolytic resistor with separate additional electrodes (3 in FIG. 1) common for separate groups 14, 15 and 16, and individual current-limiting resistors. In both embodiments, the resistor 11 in each circuit has a definite degree of autonomy and provides for splitting (distribution) of the current pulse among all the members of the cutting tool, connected in parallel one to another.

The main vertical feed is effected in the direction B by three regulators, each of which serves for its own group 14, 15 and 16 of members 5, united within each group by the feed drive.

The automatic control of the feed drive, common for the group 15 of members 5 of the cutting tool, is effected according to the voltage applied to the section of the erosion path where it has the minimum gap. The pulse for controlling the feed is obtained (FIG. 4) as a difference of potentials at the workpiece and at the resistor output 17 of the additional circuit. This resistor, having a much greater value than the resistors 11 of the power circuits, is connected with one end to the generator pole 13, and with the other to diodes 18, connecting the additional circuit to the members of the cutting electrode.

With such a method, the feed is controlled according to the minimum voltage across the most loaded section of the erosion path; thus short-circuiting between the workpiece and any member of the cutting tool is avoided. The pulse to the regulator is taken off from points 19 and 20.

It is expedient to manufacture separate members of the cutting tool from a solid electrode of a complicated shape by cutting it into parts.

The present invention has enabled the electroerosion machining of large surfaces at a high speed, whereas the intensity of current passing through each member of the cutting tool is limited according to the desired quality of the surface being machined, the characteristics of the electrode material, the surface area and shape of the hollow to be machined, etc.

What is claimed is:

1. Apparatus for electroerosion machining of surfaces of workpieces in a liquid dielectric medium, said apparatus comprising a cutting electrode-tool including an assembly of separate members connected to parallel electric power circuits, said members being spaced from one another and in a liquid dielectric medium so as to prevent short-circuiting therebetween, means for displacing said cutting tool axially and in a plane normal to the direction of axial displacement over a distance exceeding the width of the spaces between said members, and means for controlling the apial displacement of said cutting tool in accordance with the most loaded member of the cutting tool, the latter means including an additional circuit connected in parallel with said power circuits, said additional circuit comprising a resistor and said electric power crcuits including resistors and generator means, diodes being connected to said additional circuit and said members of the cutting tool, said means for controlling axial displacement of the cutting tool having a pulse output common for said members of the cutting tool according to the voltage across the section of the erosion where the voltage is minimum, the pulse output for controlling the axial displacement being obtained as a difference of potentials at the workpiece and at the output of the resistor of said additional circuit, the value of said resistor being considerably greater than the resistance of said power circuits, said resistor of the additional circuit being connected at one end to the generator means and with the other end to said diodes.

2. Apparatus as claimed in claim 1, wherein said power circuit includes an electrolyte constituting a limiting resistor.

3. Apparatus as claimed in claim 1 comprising means for continuously passing said liquid dielectric medium through the spaces between said members.

References Cited

UNITED STATES PATENTS 2,783,411   2/1957   Matulaitis.
2,920,180   1/1960   Ullmann et al.

FOREIGN PATENTS 856,340   12/1960   Great Britain.

JOSEPH V. TRUHE, Primary Examiner

R. F. STAUBLY, Assistant Examiner